United States Patent [19]

Shimizu et al.

[11] 4,455,571

[45] Jun. 19, 1984

[54] COMPRESSION SYSTEM AND COMPRESSION AND EXPANSION SYSTEM FOR A COMPOSITE VIDEO SIGNAL

[75] Inventors: Kyoichi Shimizu; Kiyoshi Sato, both of Yokohama; Tadashi Takahaski, Mitaka, all of Japan

[73] Assignee: Victor Company of Japan, Ltd., Yokohama, Japan

[21] Appl. No.: 355,510

[22] Filed: Mar. 8, 1982

[30] Foreign Application Priority Data

Mar. 10, 1981 [JP] Japan .................................. 56-34143

[51] Int. Cl.³ ............................................. H04N 7/12
[52] U.S. Cl. .................................................. 358/138
[58] Field of Search ................... 358/133, 135, 13, 138; 364/722

[56] References Cited

U.S. PATENT DOCUMENTS

| | | | |
|---|---|---|---|
| 2,959,639 | 11/1960 | Pierce | 358/133 |
| 4,179,710 | 12/1979 | Ishiguro | 358/135 |
| 4,286,291 | 8/1981 | Taylor | 358/13 |

OTHER PUBLICATIONS

Webster; David, "Digital Picture Coding", *Wireless World*, Oct. 1978, pp. 67-70.

*Primary Examiner*—Howard W. Britton
*Attorney, Agent, or Firm*—Ladas & Parry

[57] ABSTRACT

A compression and expansion system for a composite video signal comprises an extracting circuit for judging maximum and minimum points in a video signal of a composite video signal, to extract these maximum and minimum points, a digital value obtaining circuit for obtaining digital values of levels of the extracted points and digital values of positions of the extracted points in the video signal, to record and reproduce or transmit these digital values thus obtained, a circuit for performing interpolation to connect a digital value of the level and position of the extracted point which is reproduced or transmitted with a digital value of the level and position of a point which is succeedingly extracted, in a substantially linear manner, in order to expand the video signal, and a circuit for mixing a composite synchronizing signal which is separately produced with the analog video signal, to obtain the original composite video signal.

8 Claims, 8 Drawing Figures

COMPRESSION SYSTEM AND COMPRESSION AND EXPANSION SYSTEM FOR A COMPOSITE VIDEO SIGNAL

BACKGROUND OF THE INVENTION

The present invention generally relates to compression systems and compression and expansion systems for composite video signals, and more particularly to a system in which certain number of points of a video signal within a composite video signal excluding synchronizing signals are extracted, and only the information concerning level and position of the extracted points is compressed and transmitted, and further, parts of the transmitted compressed signal between the extracted points are obtained by use of a connecting linear function, to expand the complete compressed signal, and the synchronizing signals are mixed to the expanded signal to obtain the composite video signal.

Generally, when a signal is to be sampled, and this signal has a band between 0 Hz and W Hz and does not have a frequency component over W Hz, it is known from the sampling theorem that information loss will not be introduced if the signal is sampled with an interval of $\frac{1}{2}W$ seconds. If the video signal has a band between 0 Hz and approximately 4 MHz, the sampling frequency for sampling this video signal is $2 \times 4$ MHz, the horizontal scanning period is $6 \times 10^{-5}$ seconds, and the lightness (luminance level) is described by eight bits (254 steps), 3840 ($2 \times 4 \times 10^6 \times 6 \times 10^{-5} \times 8$) bits of information will be required during one horizontal scanning period by use of the normal sampling method.

However, the spectrum distribution of the video signal gradually decreases in the high frequencies, and it is unlikely that the entire spectrum will be required. Moreover, the voltage of the video signal corresponds to the lightness. When recognizing a picture, maximum points, minimum points, and rapidly changing points of lightness are generally noticed, but parts between these points where the lightness gradually change, are not noticed. Accordingly, in the normal sampling method, even the information which is hardly noticed is sampled, and there was a disadvantage in that this sampling operation performed with respect to these unnoticed points were not necessary.

SUMMARY OF THE INVENTION

Accordingly, it is a general object of the present invention to provide a novel and useful compression system and compression and expansion system for a composite video signal, in which the above described disadvantages have been overcome.

Another and more specific object of the present invention is to provide a compression system for a composite video signal, in which maximum points and minimum points of a video signal and rapidly changing points of a voltage, in a composite video signal, are extracted and only the information concerning levels and positions of the extracted points is compressed and transmitted. According to the system of the present invention, the composite video signal may be compressed with high efficiency. Moreover, by extracting the rapidly changing points of the voltage in the video signal together with the above maximum and minimum points, the video signal waveform can be recognized positively. Further, the compression of the level information can be performed by using a difference between a level of the extracted point (or the position in the video signal) and a level of a previously extracted point (or the position in the video signal), or a logarithm of an absolute value of the level difference and a digital value of that sign, instead of the extracted level (or the position in the video signal). In addition, in a case where the total number of extracted points on scanning lines which scan substantially identical parts of adjacent scanning lines or adjacent fields are the same, compression can be performed with respect to one of the scanning lines by only recording or transmitting digital values of positions of the extracted points in the video signal. It is also possible to compress the composite video signal of the color picture by respectively compressing a plurality of primary color signals or the luminance signal and the chrominance signal, or by compressing the digital value of the chrominance signal level together with the level of the extracted point, or compressing and recording or compressing and transmitting the level difference in the chrominance signals or the absolute value of the chrominance signal difference and its sign together with the level difference between the extracted point and the previously extracted point or the absolute value of the level difference and its sign.

Still another object of the present invention is to provide a compression and expansion system for a composite video signal, in which the compressed and transmitted signal is expanded into an analog video signal by linearly connecting the digital value of the level and position of the maximum and minimum points of the transmitted signal and a digital value of a succeeding level and position in a substantially linear manner by interpolation, to obtain the original composite video signal by mixing the expanded signal with a separately produced composite synchronizing signals. According to the system of the present invention, the composite video signal can be compressed with high efficiency. Moreover, when the expanded composite video signal is monitored by a television receiver, pseudo-contours which are seen upon simple bit compression of a digital video signal is not generated in the system according to the present invention.

Other objects and further features of the present invention will be apparent from the following detailed description when read in conjunction with the accompanying drawings.

DETAILED DESCRIPTION

Figure 1A:
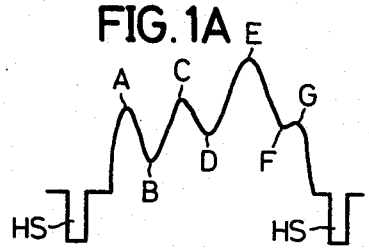
FIG. 1A shows a waveform for explaining maximum and minimum points on a video signal.

First, description will be given with respect to the fundamental principle of the system according to the present invention, by referring to FIGS. 1A and 1B. When positions and magnitudes of maximum points A, C, E, and G and minimum points B, D, and F of a video signal in a composite video signal are extracted as information in order to reproduce the video signal, the information quantity can be described by "(position+magnitude)×(number of points)". If one horizontal scanning period between horizontal synchronizing signals HS is $6\times 10^{-5}$ seconds, the chrominance level is described by 8 bits, and the sampling frequency is 8 MHz, one horizontal scanning period is sampled at 480 ($6\times 10^{-5}\times 8\times 10^6$) points. Accordingly, if the sampling points are described by 9 bits (512 points can be described by use of 9 bits), and there are 7 maximum, minimum, and rapidly changing points as shown in FIG. 1A, 119 [(9+8)×7] bits will be required upon extraction of these points.

Figure 1B:
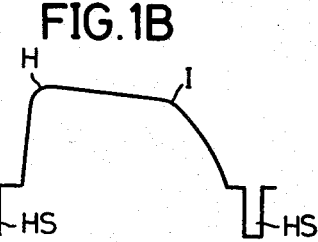
FIG. 1B shows a waveform for explaining a rapidly changing point of voltage of the video signal.

Moreover, in a waveform such as that shown in FIG. 1B, a rapidly changing point of the voltage slope indicated by I is easily noticed, together with a maximum point H. Thus, the rapidly changing points are also extracted together with the maximum and minimum points.

In order to judge that a value $M(i)$ sampled at an arbitrary point i is a maximum point or a minimum point, the following method is used. If the sampling points adjacent to the point i are $i-1, i-2, \ldots, i-n$ (n is an arbitrary positive integer) and $i+1, i+2, \ldots, i+n$, and thresholds (specific positive values) are L1 and L2, the following equations can be formed.

$$M(i-1) < M(i) > M(i+1) \qquad (1a)$$

$$M(i-1) > M(i) < M(i+1) \qquad (1b)$$

$$|M(i-1) - M(i)| > L1$$

or $$|M(i) - M(i+1)| > L1 \qquad (2)$$

If the equations (1a) and (2) are satisfied, the point is a maximum point, and if the equations (1b) and (2) are satisfied, the point is a minimum point. The equation (2) is used to eliminate error upon sampling due to noise and the like.

Next, when the above equation (2) is not satisfied and it cannot be judged whether the point is a maximum point or a minimum point, it is assumed that the point is a maximum point when the following equations (3a) and (4) are satisfied, and that the point is a minimum point when the equations (3b) and (4) are satisfied.

$$M(i-2) < M(i) > M(i+2) \qquad (3a)$$

$$M(i-2) > M(i) < M(i+2) \qquad (3b)$$

$$|M(i-2) - M(i)| > L2$$

or $$|M(i) - M(i+2)| > L2 \qquad (4)$$

Furthermore, if even the above equation (4) is not satisfied and it cannot be judged whether the point is a maximum point or a minimum point, it is assumed that $M(i)$ is a maximum point if the following equation (5a) is satisfied and that $M(i)$ is a minimum point if the following equation (5b) is satisfied for all m (m is a positive integer) where m satisfies $3 \leq m \leq n$.

$$M(i) > M(i\pm m) \qquad (5a)$$

$$M(i) < M(i\pm m) \qquad (5b)$$

Next, with respect to the rapidly changing points, $M(i)$ is a rapidly changing point when the following equations (6) and (7) are satisfied, where L3 and L4 are thresholds (specific positive values).

$$|M(i-1) - M(i)| > L3 \text{ or} \qquad (6)$$

$$|M(i) - M(i+1)| > L3$$

$$\frac{M(i-1) - M(i)}{M(i) - M(i+1)} > L4 \text{ or} \qquad (7)$$

$$0 \leq \frac{M(i-1) - M(i)}{M(i) - M(i+1)} < \frac{1}{L4}$$

Figure 2:
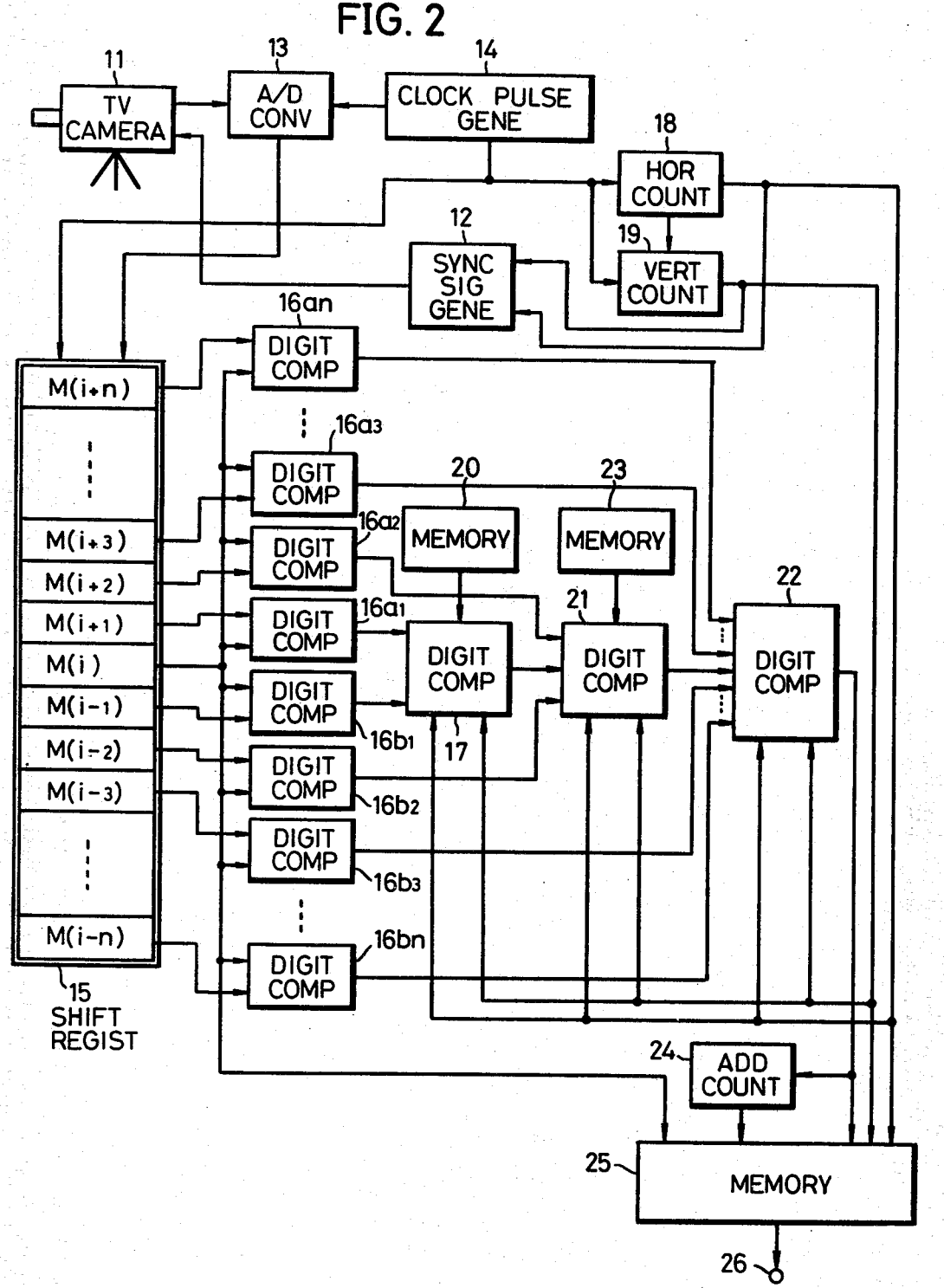
FIG. 2 is a systematic block diagram showing a compression system of an embodiment of a compression and expansion system for a composite video signal according to the present invention.

Description will now be given with respect to a compression system of a first embodiment of a compression and expansion system for a composite video signal according to the present invention, which uses the above principle, by referring to the block system shown in FIG. 2. In FIG. 2, a television camera 11 is in synchronism with a synchronizing signal supplied from a synchronizing signal generator 12 which will be described hereinafter, and supplies an analog composite video signal to an analog-to-digital (A/D) converter 13. The A/D converter 13 samples the composite video signal by a clock pulse supplied from a clock pulse generator 14. The clock pulse has a frequency which is twice the maximum frequency of the composite video signal. Thus, the composite video signal is converted into an 8-bit digital signal by the A/D converter 13, and supplied to a shift register 15. This shift register 15 comprises 2n+1 (n is an arbitrary positive integer) blocks. One block is constructed from 8 bits. The shift register 15 stores the digital signal sampled by the A/D converter 13, in units of sampling points. The sampled values stored in each block can be read out arbitrarily. The shift register 15 is supplied with the clock pulse from the clock pulse generator 14, and shifts the sampled values downwards from the upper side in FIG. 2.

The sampled values $M(i+1)$ through $M(i+n)$, and $M(i-1)$ through $M(i-n)$ in each block of the shift register 15 are respectively supplied to one input terminal of digital comparators 16*al* through 16*an* and 16*bl* through 16*bn*. The memory content $M(i)$ of a block which is shifted by (n+1) pulses after being supplied to the shift register 15, is supplied to the other input terminal of the digital comparators 16*al* through 16*an* and 16*bl* through 16*bn*, and also to a memory 25. The digital comparators 16*al* through 16*an* and 16*bl* through 16*bn* respectively compare the two inputs supplied to the two terminals, and obtain a difference and the positive or negative sign.

Difference signals $M(i) - M(i+1)$ and $M(i-1) - M(i)$ obtained at the digital comparators 16*al* and 16*bl*, are respectively supplied to a digital comparator 17. This digital comparator 17 judges whether M(i) is a maximum point, a minimum point, or a rapidly changing point satisfying the equations (1a), (1b), (2), (6), or (7), by using a horizontal position signal and a vertical position signal from horizontal and vertical counters 18 and 19, the thresholds L1, L2, and L4 from a memory 20, and the above difference signals. An output compared signal of the digital comparator 17 is supplied to a digital comparator 21.

The horizontal position signal and the vertical position signal from the horizontal and vertical counters 18 and 19 are supplied to the digital comparator 21. The digital comparator 21 passes the compared signal from the digital comparator 17 as it is, as an output compared signal of this digital comparator 21, when the compared signal from the digital comparator 17 indicates that the point is a maximum, minimum, or rapidly changing point. Hence, in this case, the compared signal from the digital comparator 17 is supplied to a digital comparator 22 through the digital comparator 21. On the other hand, when the compared signal from the digital comparator 17 does not indicate that the point is a maximum, minimum, or rapidly changing point, the digital comparator 21 judges whether the point is a maximum or minimum point which satisfies the above equations (3a) or (3b) and (4), by using the difference signals [M(i)−M(i+2)] and [M(i−2)−M(i)] supplied from the digital comparators 16a2 and 16b2 and the threshold L2 supplied from a memory 23. An output compared signal of the digital comparator 21 is accordingly supplied to the digital comparator 22.

The horizontal and vertical position signals from the horizontal and vertical counters 18 and 19, are supplied to the digital comparator 22. The digital comparator 22 passes the compared signal from the digital comparator 21 as it is, as an output compared signal of this digital comparator 22, when the compared signal from the digital comparator 21 indicates that the point is a maximum, minimum, or rapidly changing point. Thus, in this case, the output compared signal of the digital comparator 22 is supplied to an address counter 24 and the memory 25. On the other hand, when the compared signal from the digital comparator 21 does not indicate that the point is a maximum, minimum, or rapidly changing point, the digital comparator 22 judges whether the point is a maximum or minimum point which satisfies the above equations (5a) and (5b), by using the difference signals obtained from the digital comparators 16a3 through 16an and 16b3 through 16bn. An output compared signal of the digital comparator 22 is accordingly supplied to the address counter 24 and the memory 25.

In addition, the clock pulse generated by the clock pulse generator 14, is supplied to the horizontal and vertical counters 18 and 19. The horizontal counter 18 counts the above clock pulse, and produces a horizontal position signal which indicates where the sampling position i is in one horizontal scanning period. This horizontal position signal produced from the horizontal counter 18 is supplied to the synchronizing signal generator 12, vertical counter 19, digital comparators 17, 21, and 22, and the memory 25. The vertical counter 19 produces a vertical position signal which indicates the position of the horizontal scanning period of the sampling position i in one field. This vertical position signal produced from the vertical counter 19 is supplied to the synchronizing signal generator 12, digital comparators 17, 21, and 22, and the memory 25.

The horizontal and vertical position signals are respectively supplied to the digital comparators 17, 21, and 22 for the following reasons. That is, in the composite video signal compression and expansion system according to the present invention, the horizontal and vertical synchronizing signals within the composite video signal obtained from the television camera 11, are not extracted. Instead, the maximum, minimum, and rapidly changing points in the video signal are judged and extracted. Accordingly, when the sampled value of the first sample of the video signal is supplied to the shift register 15, and only the sampled value M(i+n) is in the shift register 15, it is meaningless to perform judgement with respect to M(i). Similarly, when the first sampled value of the video signal is the sampled value M(i−2) within the shift register 15, the sampled values M(i) through M(i+n) are the subject of the above judgement, while the sampled values M(i−3) through M(i−n) are not.

The digital comparators 17, 21, and 22 respectively perform judgement with respect to the sampled values which are the subject to this judgement, by use of the horizontal and vertical position signals. The synchronizing signal generator 12 is supplied with the above horizontal and vertical position signals, and produces the horizontal and vertical synchronizing signals. These horizontal and vertical synchronizing signals are supplied to the television camera 11, to obtain synchronism between the television camera 11 and the circuits in the compression system.

When there is an indication that the sampled value M(i) is a maximum, minimum, or rapidly changing point by the compared signal from the digital comparators 22, the memory 25 writes the positional information of the horizontal and vertical position signals and the lightness (luminance level) information of the sampled value M(i) obtained from the shift register 15, into addresses specified by the address counter 24. Moreover, when the compared signal from the digital comparator 22 indicates that the point is a maximum, minimum, or rapidly changing point, the address counter 24 advances the address as the above write-in operation of the memory 25 is completed, to specify the next write-in address.

As described above, the positional information regarding only the maximum, minimum, or rapidly changing point, and the chrominance level information, are respectively and successively stored into the memory 25. When the storing operation is completed for one field, the stored information is produced through an output terminal 26 in the order with which the information was originally stored, for transmitting or recording purposes. After this operation is completed, the horizontal and vertical counters 18 and 19 and the address counter 24 are reset, so that compression of the composite video signal can be performed with respect to the succeeding field.

Figure 3:
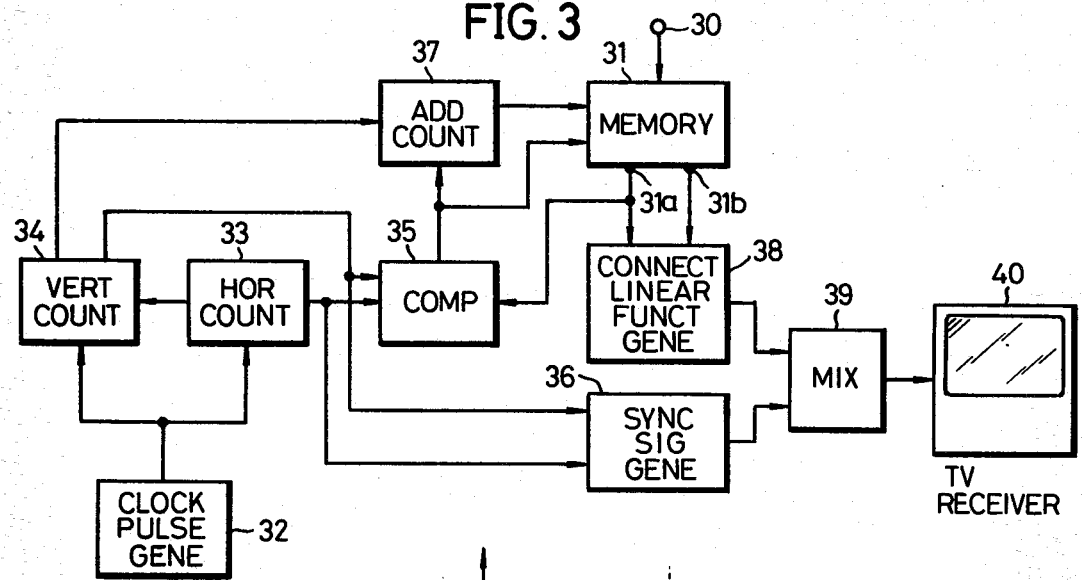
FIG. 3 is a systematic block diagram showing an expansion system for expanding the signal compressed by the compression system shown in FIG. 2.

Next, description will be given with respect to an expansion system for expanding the signal compressed by the above compression system, by referring to FIG. 3. In FIG. 3, the compressed digital signal which has been reproduced or transmitted, is supplied to a memory 31 for one field, through an input terminal 30. A clock pulse generated by a clock pulse generator 32, is supplied to horizontal and vertical counters 33 and 34. The horizontal counter 33 counts the above clock pulse, and produces a horizontal position signal indicating a position in one horizontal scanning period. This horizontal position signal is supplied to the vertical counter 34, a comparator 35, and a synchronizing signal generator 36. The vertical counter 34 produces a vertical position signal indicating the horizontal scanning period in one field, by use of the clock pulse and the horizontal position signal. This vertical position signal is supplied to the comparator 35, the synchronizing signal generator 36, and an address counter 37. When the compressed video signal is supplied to the memory 31, the address counter 37 is in a reset state. Hence, the positional information and the lightness information in the first horizontal scanning period of the compressed video signal, are read out from the memory 31. The positional information thus read out, is supplied to the comparator 35 and a connecting linear function generator 38 through a terminal 31a. The lightness information thus read out, is supplied to the connecting linear function generator 38 through a terminal 31b.

The connecting linear function generator 38 hence supplied with these positional information and the lightness information which are digital signals, produces an analog signal for performing linear interpolation by use of the previously supplied positional information and the lightness information (the position and lightness of the previous information are zero, for example, with respect to the positional information and the lightness information first supplied in the horizontal scanning period). The above analog signal produced by the connecting linear function generator 38, is supplied to a mixer 39. In addition, the comparator 35 compares the positional information from the memory 39 and the horizontal and vertical position signals from the counters 33 and 34. When these signals coincide, a coincidence signal is supplied to the address counter 37 and the memory 31 from the comparator 35. Accordingly, the address counter 37 advances the address, and the positional information and the lightness information are read out from the memory 31 from the addresses specified by the address counter 37, to perform the above interpolation.

The synchronizing signal generator 36 is supplied with the horizontal and vertical position signals, and generates a horizontal synchronizing signal and a vertical synchronizing signal at positions corresponding to these horizontal and vertical position signals. The above horizontal synchronizing signal and the vertical synchronizing signal are supplied to the mixer 39. The mixer 39 mixes the video signal which is converted into the analog form through interpolation, and the horizontal and vertical synchronizing signals, to form the original composite color video signal. The composite video signal thus formed, is supplied to a television receiver 40.

When the vertical counter 34 indicates that the expansion operation for one field is completed, the address counter 37 is accordingly reset. Then, the following compressed digital signal is supplied to the input terminal 30, and the above described operations are repeated.

Furthermore, since the connecting linear function generator 38 performs linear interpolation, the pseudo-contours which will be described hereinafter will not be introduced, when the expanded composite video signal is monitored by a television receiver.

Figure 4:
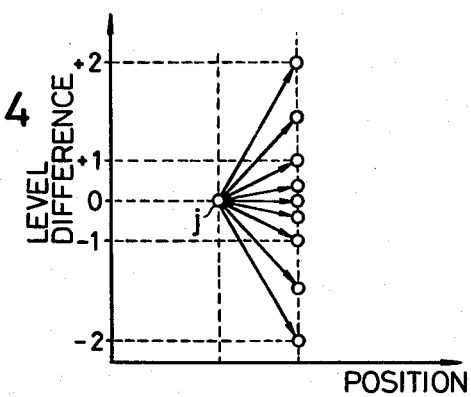
FIG. 4 graphically shows a difference of lightness at two adjacent extracted points in logarithm.

Next, description will be given with respect to a compression system of a second embodiment of a system according to the present invention, by referring to FIGS. 4 through 6. In the above described compression system of the first embodiment of the system according to the present invention, the lightness is converted into 8 bits (256 steps) at the extracting points of the maximum, minimum, and rapidly changing points. In the normal video signal, the quantization noise is increased when the number of bits describing the above lightness is decreased, and further, pseudo-contours are introduced in the reproduced picture. However, if the level difference between the lightness of the extracted point and the previously extracted point on the scanning line is to be stored, the lightness difference can generally be described by 7 bits. In addition, by storing the logarithm and the sign of the absolute value of the above lightness difference, the information quantity can be decreased.

As the level difference between the extracted point and the previously extracted point j increases, there is a limit in storing the large level difference within a certain number of bits. However, as shown in FIG. 4, if the logarithm of the level difference is stored, the large level difference can be stored within the same number of bits with higher accuracy. The quantitative sense of the human eye is high when the lightness difference between adjacent picture is small, and low when the lightness difference is large, that is, when the lightness drastically changes. Therefore, when the lightness is changing drastically, the eye can judge that there is a change in the lightness, however, it is impossible to judge whether the lightness is increasing to twice or three times the original lightness. Therefore, even when the logarithm of the lightness difference is used, to give an exponential stop, the information can be compressed without introducing degradation in the reproduced picture quality.

Next, description will be given with respect to a compression system of a second embodiment of a system according to the present invention, which was devised based on the above points, by referring to FIG. 5. In FIG. 5, those parts which are the same as those corresponding parts in FIG. 2 are designated by the same reference numerals, and their description will be omitted.

The sampled value M(i) in the shift register 15, which is used to judge whether the point should be extracted because the point is a maximum, minimum, or rapidly changing point, is supplied to one input terminal of a memory 50 and a subtraction circuit 51. The memory 50 is supplied with the compared signal from the digital comparator 22, and when this compared signal indicates that the sampled value M(i) is a point to be extracted, the memory 50 stores this sampled value M(i). The stored sampled value M(i) is supplied to the other input terminal of the subtraction circuit 51. Then, a sampled value M(i) a which is judged as being the succeeding point which is to be extracted, is supplied to the memory 50 and the subtraction circuit 51. The subtraction circuit 51 obtains a difference between the previously extracted sampled value M(i) from the memory 50 and the extracted sampled value M(i)a from the shift register 15, and supplies this difference to the memory 25. In the first embodiment of the invention, the memory 25 stores the sampled value 25. However, in the present embodiment of the invention, the memory 25 stores the above difference [M(i)a−M(i)]. Further, the memory 50 simultaneously stores the sampled value M(i)a.

Figure 5:
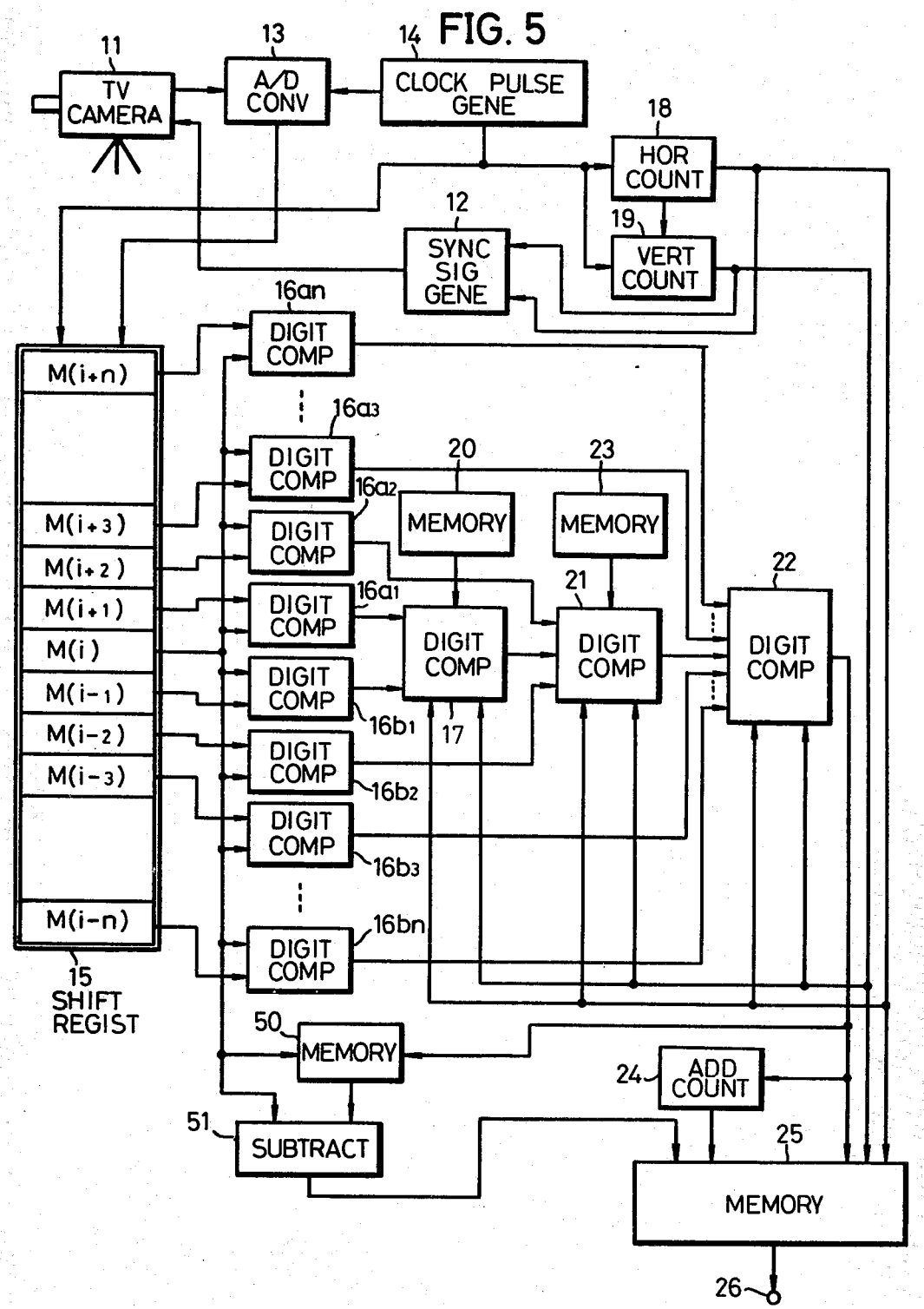
FIG. 5 is a systematic block diagram showing a compression system of another embodiment of a compression and expansion system for a composite video signal according to the present invention.
Figure 7:
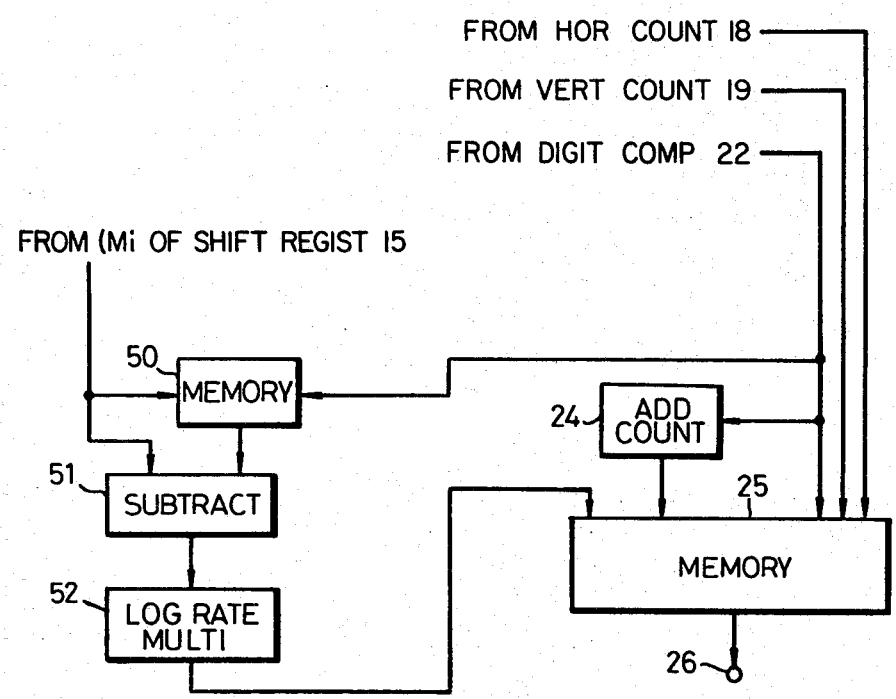
FIG. 7 is a systematic block diagram showing a part of a modification of the embodiment of the compression and expansion system shown in FIG. 5.

FIG. 7 shows a part of a modification of the system shown in FIG. 5. In FIG. 7, those parts which are the same as those corresponding parts in FIG. 5 are designated by the same reference numerals, and their description will be omitted. In FIG. 7, instead of supplying the difference [M(i)a−M(i)] to the memory 25 from the subtracting circuit 51, the difference [M(i)a−M(i)] is supplied to a logarithm rate multiplier 52. In this case, the logarithm of the difference [M(i)a−M(i)] is obtained at the logarithm rate multiplier 52, and the logarithmic value [log(M(i)a−M(i))] is supplied to the memory 25, to store this logarithmic value in the memory 25.

Generally, in adjacent scanning lines of the video signal, the mutual correlation coefficient which is calculated by multiplication and addition of picture elements corresponding to each other along the direction towards the adjacent scanning line, is generally over 0.9. If the picture is in the form of stripes which are perpendicular to the horizontal scanning direction, the mutual correlation coefficient is close to 1, however, in a picture where the stripes are inclined, the mutual correlation coefficient rapidly decreases. In these cases, the lightness, the lightness difference, or the logarithm of the lightness difference and the like of the maximum, minimum, and rapidly changing points extracted by the compression systems in the first and second embodiments of the present invention, that is, the lightness information is the same in the adjacent scanning lines, and only the positional information differ between adjacent scanning lines. In these cases, it is possible to more effective perform compression of the information, by only extracting the positional information and using the lightness information obtained from the previous scanning line.

Figure 6:
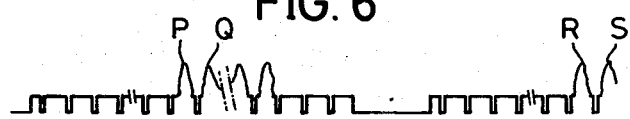
FIG. 6 shows a waveform indicating substantially identical parts of adjacent fields.

Moreover, the above compression method can also be applied to scanning lines in substantially the same position of the picture at differing times, as in the case shown in FIG. 6. In FIG. 6, points P and Q respectively correspond to points R and S. The above method can be applied regardless of whether there is interlace between fields. Generally, the mutual correlation coefficient of the scanning lines, is also quite high between fields. However, when panning is performed with respect to an object, the mutual correlation coefficient decreases rapidly. However, only the positional information changes and the lightness information of the maximum, minimum, and rapidly changing points does not change in this case. Accordingly, as in the above described case, only the positional information need to be extracted, and the lightness information of the scanning line in the previous field can be used. To judge whether this compression method can be applied, the number of maximum, minimum, and rapidly changing points on scanning lines of corresponding fields are counted, and measures may be taken so that only the positional information is extracted if the number of the points are the same.

In the above described embodiments of the present invention, description was given with respect to a black-and-white video signal. However, it is also possible to apply the system according to the present invention with respect to a composite color video signal. In this case, the compression and expansion system of the present invention is applied to the three primary color signals, or the luminance signal and the chrominance signal such as the I signal and the Q signal.

There is high correlation among the color phase, the color saturation, and the lightness of a color picture. Moreover, when the lightness changes, the color phase and the color saturation changes with this change in lightness. Hence, the lightness seldom remains constant when the color phase and the color saturation change. The changing points (maximum, minimum, and rapidly changing points) of the lightness include the changing points of the color phase and the color saturation. Accordingly, by adding the color phase and color saturation information (chrominance information) to the lightness information which is sampled at the compression system according to the present invention, it is also possible to compress a composite color video signal. Furthermore, the color phase and the color saturation information can be the I-axis and the Q-axis of the NTSC system signal which indirectly describe the color phase and color saturation information, or the color difference signal.

Further, the present invention is not limited to these embodiments, but various variations and modifications may be made without departing from the scope of the present invention.

What is claimed is:

1. A compression system for a composite video signal comprising:

shift register means sequentially supplied with sampled values of the composite video signal, for sequentially storing and shifting each of the sampled values;

position signal generating means synchronized with said shift register means, for generating a position signal which indicates the sampling point of each sampled value in the composite video signal;

comparing means supplied with each of the sampled values stored in said shift register means, for comparing an arbitrary sampled value with each of the other sampled values stored in said shift register means;

discriminating means supplied with output compared results of said comparing means, for discriminating whether the sampling point of said arbitrary sampled value is a maximum point, a minimum point, or a rapidly changing point of the composite video signal, and for producing a discrimination signal which indicates the discriminated result; and transmitting means for transmitting said arbitrary sampled value from said shift register means together with said position signal from said position signal generating means only when said discrimination signal from said discriminating means indicates that the sampling point of said arbitrary sampled value is a maximum, minimum, or rapidly changing point of the composite video signal.

2. A compression system as claimed in claim 1 in which said position signal comprises a vertical position signal which indicates the horizontal scanning period in which the sampling point of each sampled value exists in one field of the composite video signal, and a horizontal position signal which indicates the position of the sampling point of each sampled value in said horizontal scanning period indicated by said vertical position signal.

3. A compression system as claimed in claim 1 in which said shift register means comprises $(2n+1)$ blocks where n is a predetermined positive integer, and said discriminating means discriminates that the sampling point of said arbitrary sampled value is a maximum point when a relation $M(i) > M(i \pm m)$ is satisfied, a minimum point when a relation $M(i) < M(i \pm m)$ is satisfied, and a rapidly changing point when a relation $|M(i \pm 1) - M(i)| > L_3$ is satisfied, when $M(i)$ represents said arbitrary sampled value at an arbitrary sampling point i, m is a positive integer satisfying $1 \leq m \leq n$, and $L_3$ is a predetermined threshold, said discriminating means carrying out the discrimination by varying m from 1 to n.

4. A compression system as claimed in claim 1 in which, when the total number of maximum, minimum, and rapidly changing points discriminated by said discriminating means with respect to one scanning line is the same as the total number of maximum, minimum, and rapidly changing points discriminated with respect to an adjacent scanning line, said transmitting means transmits said arbitrary sampled value from said shift register means together with said position signal from said position signal generating means with respect to said one scanning line, and transmits only said position signal from said position signal generating means with respect to said adjacent scanning line.

5. A compression system as claimed in claim 1 in which, when the total number of maximum, minimum, and rapidly changing points discriminated by said discriminating means with respect to one scanning line in an arbitrary field is the same as the total number of maximum, minimum, and rapdily changing points discriminated with respect to another scanning line in a field adjacent to said arbitrary field and located at substantially the same part of the field as said one scanning line, said transmitting means transmits said arbitrary sampled value from said shift register means and said position signal from said position signal generating means with respect to said one scanning line in said arbitrary field, and transmits only said position signal from said position signal generating means with respect to said other scanning line in said field adjacent to said arbitrary field.

6. A compression system for a composite video signal comprising:
shift register means sequentially supplied with sampled values of the composite video signal, for sequentially storing and shifting each of the sampled values;
position signal generating means synchronized with said shift register means, for generating a position signal which indicates the sampling point of each sampled value in the composite video signal;
comparing means supplied with each of the sampled values stored in said shift register means, for comparing an arbitrary sampled value with each of the other sampled values stored in said shift register means;
discriminating means supplied with output compared results of said comparing means, for discriminating whether the sampling point of said arbitrary sampled value is a maximum point, a minimum point, or a rapidly changing point of the composite video signal, and for producing a discrimination signal which indicates the discriminated result;
memory means for successively storing each arbitrary sampled value from said shift register means when said discrimination signal from said discriminating means indicates that the sampling point of the arbitrary sampled value is a maximum, minimum, or rapidly changing point of the composite video signal; and
transmitting means for transmitting a difference between two successive sampled values stored in said memory means together with said position signal in response to said discrimination signal from said discriminating means.

7. A compression system for a composite video signal comprising:
shift register means sequentially supplied with sampled values of the composite video signal, for sequentially storing and shifting each of the sampled values;
position signal generating means synchronized with said shift register means, for generating a position signal which indicates the sampling point of each sampled value in the composite video signal;
comparing means supplied with each of the sampled values stored in said shift register means, for comparing an arbitrary sampled value with each of the other sampled values stored in said shift register means;
discriminating means supplied with output compared results of said comparing means, for discriminating whether the sampling point of said arbitrary sampled value is a maximum point, a minimum point, or a rapidly changing point of the composite video signal, and for producing a discrimination signal which indicates the discriminated result;
memory means for successively storing each arbitrary sampled value from said shift register means when said discrimination signal from said discriminating means indicates that the sampling point of the arbitrary sampled value is a maximum, minimum, or rapidly changing point of the composite video signal; and
transmitting means for transmitting a logarithm of a difference between two successive sampled values stored in said memory means together with said position signal in response to said discrimination signal from said discriminating means.

8. A compression and expansion system for a composite video signal comprising:
shift register means sequentially supplied with sampled values of the composite video signal, for sequentially storing and shifting each of the sampled values;
position signal generating means synchronized with said shift register means, for generating a position signal which indicates the sampling point of each sampled value in the composite video signal;
comparing means supplied with each of the sampled values stored in said shift register means, for comparing an arbitrary sampled value with each of the other sampled values stored in said shift register means;
discriminating means supplied with output compared results of said comparing means, for discriminating whether the sampling point of said arbitrary sampled value is a maximum point, a minimum point, or a rapidly changing point of the composite video signal, and for producing a discrimination signal which indicates the discriminated result;
transmitting means for transmitting said arbitrary sampled value from said shift register means together with said position signal from said position signal generating means only when said discrimination signal from said discriminating means indicates that the sampling point of said arbitrary sampled value is a maximum, minimum, or rapidly changing point of the composite video signal;
interpolating means for performing interpolation to connect each successive sampled value transmitted by said transmitting means in a substantially linear manner so as to expand the video signal; and
mixing means for mixing a composite synchronizing signal which is independently produced, with the expanded video signal, so as to obtain the original composite video signal.

* * * * *